US007209824B2

(12) United States Patent
Henn et al.

(10) Patent No.: US 7,209,824 B2
(45) Date of Patent: Apr. 24, 2007

(54) METHOD AND DEVICE FOR REGULATING AN INTERNAL COMBUSTION ENGINE

(75) Inventors: Michael Henn, Lehre (DE); Martin Jehle, Regensburg (DE); Hong Zhang, Tegernheim (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/564,908

(22) PCT Filed: Apr. 20, 2004

(86) PCT No.: PCT/EP2004/050569

§ 371 (c)(1), (2), (4) Date: Jan. 17, 2006

(87) PCT Pub. No.: WO2005/010333

PCT Pub. Date: Feb. 3, 2005

(65) Prior Publication Data

US 2006/0167612 A1 Jul. 27, 2006

(30) Foreign Application Priority Data

Jul. 17, 2003 (DE) ................................ 103 32 608

(51) Int. Cl.
*F02D 43/02* (2006.01)
*F02D 41/14* (2006.01)
*G06F 19/00* (2006.01)

(52) U.S. Cl. ...................... 701/103; 701/114; 701/109; 123/480; 73/118.2

(58) Field of Classification Search ................ 701/103, 701/104, 102, 101, 115; 123/480, 478; 73/117.3, 73/118.2
See application file for complete search history.

(56) References Cited

U.S. PATENT DOCUMENTS

| | | | | |
|---|---|---|---|---|
| 4,866,620 | A * | 9/1989 | Abe et al. | 701/103 |
| 4,944,271 | A * | 7/1990 | Iwata et al. | 123/494 |
| 5,143,111 | A * | 9/1992 | Durbin | 123/527 |
| 6,282,485 | B1 * | 8/2001 | Kotwicki et al. | 701/104 |
| 6,467,442 | B2 * | 10/2002 | Russell et al. | 123/295 |

FOREIGN PATENT DOCUMENTS

| | | |
|---|---|---|
| DE | 197 05 766 C1 | 8/1998 |
| EP | 0 275 507 A2 | 7/1988 |
| WO | WO 96/32579 A1 | 10/1996 |
| WO | WO 97/35106 | 9/1997 |

* cited by examiner

*Primary Examiner*—Hieu T. Vo

(57) ABSTRACT

A method for regulating an internal combustion engine where engine measurement and engine adjustment values is provided, and adaptation values modify the engine parameters, comprising measuring a first engine measurement parameter representative of a first physical engine parameter, measuring a second engine measurement parameter representative of a second physical engine parameter, calculating a first estimation parameter via a first engine parameter, calculating a second estimation parameter via a second engine parameter, determining a first operating mode of the engine regulation method, the first operating mode determined by generating a first adaptation value based on the first engine parameter, generating a second adaptation value based on the second measurement parameter, and comparing the percent difference of the first and second adaptation values to a neutral value of the respective engine parameter, and determining a second operating mode of the engine regulation method.

19 Claims, 3 Drawing Sheets

METHOD AND DEVICE FOR REGULATING AN INTERNAL COMBUSTION ENGINE

CROSS REFERENCE TO RELATED APPLICATIONS

This application is the US National Stage of International Application No. PCT/EP2004/050569, filed Apr. 20, 2004 and claims the benefit thereof. The International Application claims the benefits of German Patent application No. 10332608.1 filed Jul. 17, 2003, all of the applications are incorporated by reference herein in their entirety.

FIELD OF THE INVENTION

The invention relates to a method for regulating an internal combustion engine according to one or more physical models, wherein measurement values and adjustment values are provided as system parameters underlying the physical model. The invention also relates to a device for regulating an internal combustion engine according to one or more physical models.

BACKGROUND OF THE INVENTION

Engine controls for internal combustion engines normally use physical models which have parameters by means of which the ideal state of the internal combustion engine can be described. In reality, the underlying parameters of the physical model generally deviate from the real parameters of the engine. In order to match the physical models to the actual conditions in the internal combustion engine, adaptations of the parameters are carried out which are based on a comparison between measured parameters and theoretically expected values. The parameters are adapted by applying one or more adaptation values to said parameters.

It is desirable for the adaptations to be executed such that adaptation values are applied to those parameters of the physical models which are actually the cause of the deviation between the physical models and the real conditions in the internal combustion engine. If those parameters which are actually the cause of the deviation between model and reality are adjusted with the aid of adaptation values, the physical models deliver precise results even when there are rapid changes in the working point of the internal combustion engine without a repeat adaptation being required. If other parameters are adapted which are not the cause of the deviation between model and the real conditions, then a repeat adaptation is generally required when there is a change in the working point. The assignment of deviations to the correct system parameters (parameters) can, however, be difficult since the number of sensors for measuring the parameters is frequently limited.

Such a problem is present in internal combustion engines which have an intake manifold pressure sensor in an intake pipe but do not have an air mass sensor, particularly in internal combustion engines with variable valve control. The intake manifold pressure in such systems depends above all on the flow cross-section at a throttle valve and on the absorption capacity of the engine. The absorption capacity of the engine is essentially determined by the settings of the intake and outlet valves and/or by the rotational speed of the internal combustion engine. If the intake manifold pressure sensor identifies an intake manifold pressure which is higher than the theoretically expected value, then this may be caused by a greater flow cross-section at the throttle valve then specified by the corresponding parameter or by a lower absorption capacity than specified by the corresponding parameter. If in this state the flow cross-section of the throttle valve is adapted upwardly, then the calculated air mass becomes too great and the injection quantity is mistakenly raised. This results in too rich an air/fuel ratio in the combustion chamber of the internal combustion engine. The air/fuel ratio that is too rich can be detected by means of the lambda probe. The measured air/fuel ratio leads to an adaptation of the quantity of fuel injected, which is reduced as result, i.e. the corresponding adaptation value for the fuel quantity is decreased. The desired air/fuel ratio can in this way be maintained. Although the model for a specified working point of the internal combustion engine can in this way be brought into harmony with the measurement values, nonetheless incorrect parameters are adapted which determine at another working point defective model parameters so that an adaptation has to be carried out afresh. Under changing operating conditions, this would result in the underlying physical model having to be adapted constantly to the changed operating state. As a result, an adaptation of the physical model can be implemented only when the operating state is static.

Such a physical model for determining the air mass flow, which is determined with the aid of the measured intake manifold pressure, is known from publication WO 97/35106. Furthermore, an adaptation is provided for permanently adjusting the model parameters in a stationary and in a nonstationary operation in order to adapt the accuracy of the selected physical model.

SUMMARY OF THE INVENTION

The object of the present invention is to provide a method for controlling an internal combustion engine according to one or more physical models, wherein the parameters of the physical model can be adapted in an improved way. There is also provided a device for controlling an internal combustion engine which has a control based on one or more physical models, wherein the parameters of the physical model(s) are adapted in an improved way.

This object is achieved in the method according to the claims.

Further advantageous embodiments of the invention are specified in the dependent claims.

According to a first aspect of the present invention, a method is provided for controlling an internal combustion engine according to one or more physical models. Measurement values and adjustment values are provided as system parameters which underlie the physical model. One or more adaptation values, respectively, can be applied to the system parameters in order to adapt the physical model to real conditions of the internal combustion engine. Estimation parameters are determined by means of the system parameters, measurement parameters being determined in a measurement of the physical parameters underlying the estimation parameters. The measurement parameters are evaluated in relation to the estimation parameters and determined in accordance with an adaptation method with the aid of the measurement parameter adaptation values for at least a part of the system parameters. Depending on the adaptation values, a first operating mode or a second operating mode is adopted. The adaptation method is preferably implemented in the first operating mode and a further adaptation method implemented in the second operating mode.

In a preferred embodiment, a first estimation parameter and a second estimation parameter are determined by means of a first system parameter and/or a second system parameter and/or a third system parameter. In a measurement of a physical parameter underlying the first estimation parameter, e.g. in an exhaust pipe, a first measurement parameter is determined and in a measurement of a physical parameter underlying the second estimation parameter, e.g. in an intake pipe, a second measurement parameter is determined. The first measurement parameter is evaluated in relation to the first estimation parameter and the second measurement parameter is evaluated in relation to the second estimation parameter, a first adaptation value of the first system parameter being determined with the aid of the first measurement parameter. In a first operating mode, a second adaptation value for the second system parameter is determined with the aid of the second measurement parameter and a third adaptation value for the third system parameter is left unchanged. A change in the second adaptation value causes, due to the regulation, a change in the first system parameter. A second operating mode is adopted if the first adaptation value determined deviates from a neutral value by a first absolute on relative deviation value and the second adaptation mode determined in the first operating mode deviates by a second absolute or relative deviation value from a neutral value. In the second operating mode, the second adaptation value for the second system parameter is reset and the third adaptation value for the third system parameter determined with the aid of the second measurement parameter, the second adaptation value for the second system parameter being left unchanged after the resetting.

The inventive method has the advantage that when the system parameters underlying a physical model are adapted using measurement values, those system parameters are adapted which are probably the cause of the deviation of the actual conditions and the theoretical model. Since as a rule only a limited number of sensors are provided which can be used for adapting system parameters of the physical model, it frequently cannot be determined unambiguously which of the system parameters has to be adapted due to a deviation of a measured value from a theoretically expected value. This is the case when the deviation from the theoretically expected value can be caused by two or more deviations of system parameters.

If, when the physical model is adapted, two measurement parameters are determined, the adaptation of the second system parameter due to the regulation resulting in the first system parameter having to be readapted, then it can be assumed with a certain degree of probability that instead of the second system parameter the third system parameter has to be adapted if the adaptation value determined deviates from the neutral value by the first deviation value and second adaptation value deviates from the neutral value by the second deviation value. The neutral value is determined by the value at which no deviation is present, i.e. no adaptation has had to be or will have to be undertaken.

Thus, if it is ascertained that a second adaptation value, which in the course of the adaptation was changed by a specified deviation value, has to be applied to the second system parameter, and simultaneously a first adaptation value has to be applied to the first system parameter, then it may be obvious for the third system parameter to be adapted instead of the second system parameter and for the previous adaptation of the second system parameter to be returned to the initial value.

The advantage of the inventive method is that it can be ascertained from adaptation values already determined whether the adaptation of one of the system parameters corresponds to a deviation of a physical parameter underlying the system parameter or whether a deviation of another system parameter is present. If this is ascertained, according to the invention the adaptation of the second system parameter is terminated and an adaptation of the third system parameter carried out instead.

In principle, the system parameters of the physical model can be adapted in a random manner in order to provide suitable adapted system parameters for a specified working point. The adaptation of those system parameters which are responsible for the deviation between the estimation parameter and the measured value is, however, advantageous since, when there is a change in the engine working point no substantial change in the adaptation values is necessary if the correct system parameters have been adapted. If the wrong system parameters have been adapted, then a repeat adaptation is necessary at each new engine working point.

It can preferably be provided that the resetting of the second adaptation value is carried out gradually so that no abrupt change in the model parameters leads to an abrupt change in the third adaptation value. This could lead to a fluctuation of the physical model parameters since a change in a system parameter frequently leads to a change in a further system parameter only after a defined cycle time, so the adaptations of the system parameters would occur at staggered times relative to one another.

Alternatively, when the second adaptation value is reset, the second adaptation value can be switched to a corresponding modification of the first adaptation value and/or a corresponding third adaptation value. In this way, it is also possible to establish a “gentle” transition between the first and second operating modes.

Advantageously, the second operating mode is adopted if the first adaptation value determined is increased relative to the neutral value by the amount of the first deviation value and the second adaptation value determined in the first operating mode is reduced relative to the neutral value by the amount of the second deviation value or if the first adaptation value determined is reduced relative to the neutral value by the amount of the first deviation value and the second adaptation value determined in the first operation mode is increased relative to the neutral value by the amount of the second deviation value.

It can be provided that the first operating mode is adopted each time the internal combustion engine is started.

It can also be provided that after a specified period of time after the second operating mode has been adopted a switchover is made from the second operating mode to the first operating mode without the third adaptation value being reset. In this way, it is possible that after the adaptation of the third adaptation value in the first operating mode the second adaptation value can also be modified again and that an adaptation of the third and of the second adaptation value is possible.

A parameter which influences the opening time of a fuel injection valve is preferably provided as a first system parameter and/or a flow cross-section of the airflow let into the intake pipe as a second system parameter and/or an absorption characteristic curve of the internal combustion engine or a valve setting of an intake and/or outlet valve as a third system parameter.

It can also be provided that the air/fuel ratio in an exhaust pipe of the internal combustion engine is determined as a first measurement value and/or the intake manifold pressure in an intake manifold of the internal combustion engine as a second measurement value.

BRIEF DESCRIPTION OF THE DRAWINGS

A preferred embodiment of the invention is explained in detail below with reference to the attached drawings, in which.

DETAILED DESCRIPTION OF THE INVENTION

Figure 1:
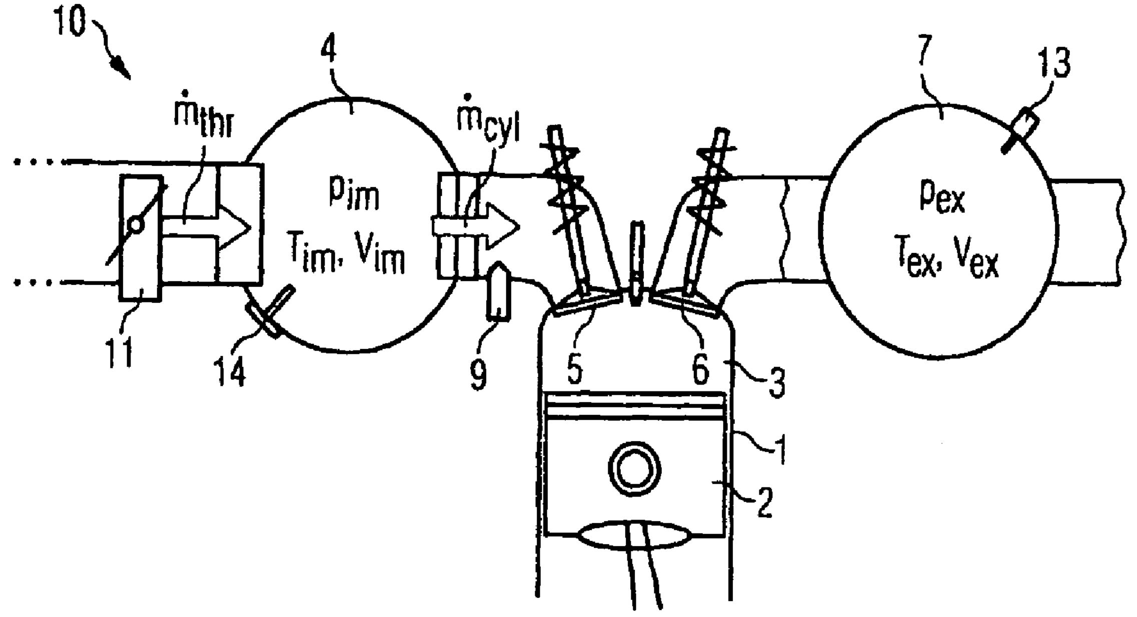
FIG. 1 shows a schematic model of an internal combustion engine.

FIG. 1 shows schematically an internal combustion engine comprising a cylinder 1. The cylinder 1 has a piston 2 and a combustion chamber 3. A fuel/air mixture is supplied in an intake manifold 4 and can be let into the combustion chamber 3 via an intake valve 5.

There is also provided an outlet valve 6 which is disposed on the combustion chamber 3 in order to discharge exhaust gas into an exhaust pipe 7. The setting (relative opening and closing times) of the intake valve 5 and of the outlet valve 6 are controlled by a regulating unit (not shown) and are set with regard to the absorption behavior of the system as a whole.

Also disposed on the intake manifold 4 is an injection valve 9 in order to inject fuel. The quantity of fuel injected is determined by the opening time of the injection valve 9. The opening time of the injection valve 9 is controlled by the regulating unit (not shown). The intake manifold 4 is also connected to an air feed 10 in order to feed air with a defined air mass flow to the intake manifold 4. A throttle valve is disposed in the air feed 10, which throttle valve can swivellably control the air mass flow into the intake manifold 4. The throttle valve has a flow cross-section that depends on the control. The throttle valve 11 can be controlled via the regulating unit (not shown).

The internal combustion engine according to FIG. 1 is based on a physical model, according to which the mass flows into the intake manifold 4 and out of the intake manifold 4 determine the pressure in the intake manifold 4. The pressure in the intake manifold 4 is essential to control of the internal combustion engine since the mass flow into the cylinder 1 is determined by means of the pressure and the absorption characteristic curve of the cylinder 1. Since the settings of the intake and outlet valves, i.e. their phase position, influence the absorption behavior of the cylinder 1, precise knowledge of the absorption behavior is required. According to a physical model on which the internal combustion engine is based, the pressure in the intake manifold is determined by:

$$\dot{P}_{im} = \frac{R_g \cdot T_{im}}{V_{im}}(\dot{m}_{thr} - \dot{m}_{cyl})$$

where T corresponds to the temperature in the intake manifold, $V_{im}$ to the volume of the intake manifold, $\dot{m}_{thr}$ to the air mass flow into the intake manifold, $\dot{m}_{cyl}$ essentially to the intake quantity of the air/fuel mixture fed to the cylinder 1 and $R_g$ to the gas constant of the air/fuel mixture. The equation shown represents a physical model by means of which the pressure in the intake manifold 4 can be determined.

In order to be able to operate the internal combustion engine 1, knowledge of the air mass flow into the intake manifold is required. Due to component tolerances or other influences on the internal combustion engine, deviations from the theoretically expected value and the real values of parameters in the internal combustion engine can arise. For example, the air mass flow $\dot{m}_{thr}$ into the intake manifold 4 can have a different value than expected based on the flow cross-section of the throttle valve 11. Such a deviation can arise due to faults or other tolerances.

It is also possible for the fuel quantity injected by the injection valve 9 not to match the quantity which would be expected on the basis of the control signal specified for the injection valve 9. Thus, the quantity of fuel injected is determined by the opening time of the injection valve 9; however, due to component tolerances deviations can occur in the cross-section of the opening of the injection valve 9. Furthermore, deviations can also occur due to component fluctuations between the calculated exhaust gas flow into the intake manifold 4 and the real exhaust gas flow into the intake manifold 4.

Using a lambda probe 13, it can be determined whether the combustion in the cylinder 1 has taken place with too rich an air/fuel mixture or too lean an air/fuel mixture. By means of a lambda regulation implemented in the regulating unit, the value for the air/fuel ratio is fed to a regulation by means of which the opening time of the injection valve 9 and consequently the quantity of fuel to be injected are controlled.

In order to establish whether there are deviations between the theoretically expected values and the real values, a pressure sensor 14 is disposed in the intake manifold 4 in order to record the pressure in the intake manifold. The value of the pressure in the intake manifold 4 is made available to the regulating unit. If the measured pressure deviates from the pressure theoretically expected in the intake manifold 4, then there must be a deviation in one of the aforementioned system parameters.

In order to adapt the underlying physical model to reality, adaptation values are provided for each of the system parameters. The adaptation values are modifiable and adapt one or more of the system parameters such that the physical model for the working point adopted in the internal combustion engine is suitable for describing the overall system so that control of the throttle valve, the injection valve 9 and the intake and outlet valves 5, 6 can be implemented optimally for the internal combustion engine.

If the measured pressure in the intake manifold 4 deviates from the theoretically expected value, then this may point firstly to an incorrectly determined air mass flow into the intake manifold 4 and secondly to a deviating absorption behavior of the cylinder 1 relative to an expected absorption behavior. Where a measured pressure is greater than the theoretically expected value, this means that the air mass flow of the air sucked into the intake manifold 4 is greater than expected on the basis of the flow cross-section of the throttle valve 11. The increased pressure in the intake manifold 4 can, however, also arise as a result of a deviating absorption behavior, whereby less of the air/fuel mixture is let into the combustion chamber 3 than specified on the basis of the absorption characteristic curve. Since at the same time an adaptation based on the measured pressure can usefully be made either to the flow cross-section of the throttle valve or to the absorption behavior, it may be that an adaptation is made to a system parameter which is not responsible for the deviation in the intake manifold pressure.

If the system parameter of the flow cross-section is adapted, even though the increased pressure in the intake manifold 4 is caused by a deviating absorption behavior of the cylinder 1, then the calculated air mass will be too great and the injection quantity increased mistakenly. The increased injection quantity leads to too rich an air/fuel ratio, which can be determined with the aid of the lambda probe. With the lambda probe, a further adaptation relating to the injection quantity is then carried out, the quantity of fuel being reduced in order to obtain the desired air/fuel ratio. Although in this way the model for a working point of the internal combustion engine can be brought into harmony with the measurement values, the incorrect system parameters are adapted which at a different working point will probably not be appropriate. At a different working point, an adaptation has then to be carried out again, which necessitates a certain period of time during which the internal combustion engine will not be functioning optimally.

If the cause of an increased intake manifold pressure lies in the fact that the absorption behavior of the cylinder 1 is lower than the theoretically expected value, i.e. for a defined valve opening time and valve position a smaller quantity of the air/fuel mixture is let into the combustion chamber 3, then it would be useful to adapt the absorption behavior of the cylinder 1 with the aid of one or more adaptation values. If, instead, the adaptation value of the flow cross-section is increased, then a further adaptation of the injection quantity based on the measured lambda value causes a change in the adaptation value for the injection quantity. Since applying an adaptation value to the flow cross-section and applying an adaptation value to the injection quantity do not describe the real cause of the deviation in the intake manifold pressure, it is probable that a repeat adaptation of all system parameters will have to be carried out when the working point of the internal combustion engine changes.

Figure 2:
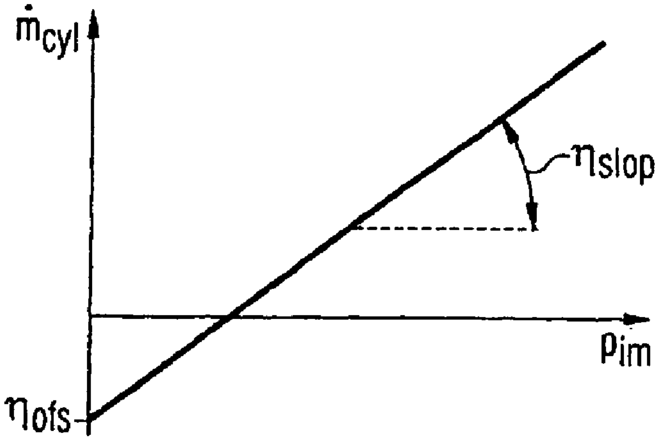
FIG. 2 shows a diagram of the absorption behavior of the internal combustion engine.

FIG. 2 shows the characteristic curve of the absorption behavior of the cylinder 1. The absorption characteristic curve is a straight line with an offset value $\eta_{OFS}$ and a gradient $\eta_{SLOP}$. The absorption characteristic curve describes a dependency between the flow of the air/fuel mixture in the cylinder and the pressure in the intake manifold. The offset value $\eta_{OFS}$ and the gradient $\eta_{SLOP}$ are parameters which are produced from the respective valve settings of the intake and outlet valves, the rotational speed of the engine and possibly other parameters. When the absorption behavior is adapted, adaptation values can be applied both to the parameters $\eta_{OFS}$ and/or $\eta_{SLOP}$ and to the parameters for the valve settings.

Figure 3:
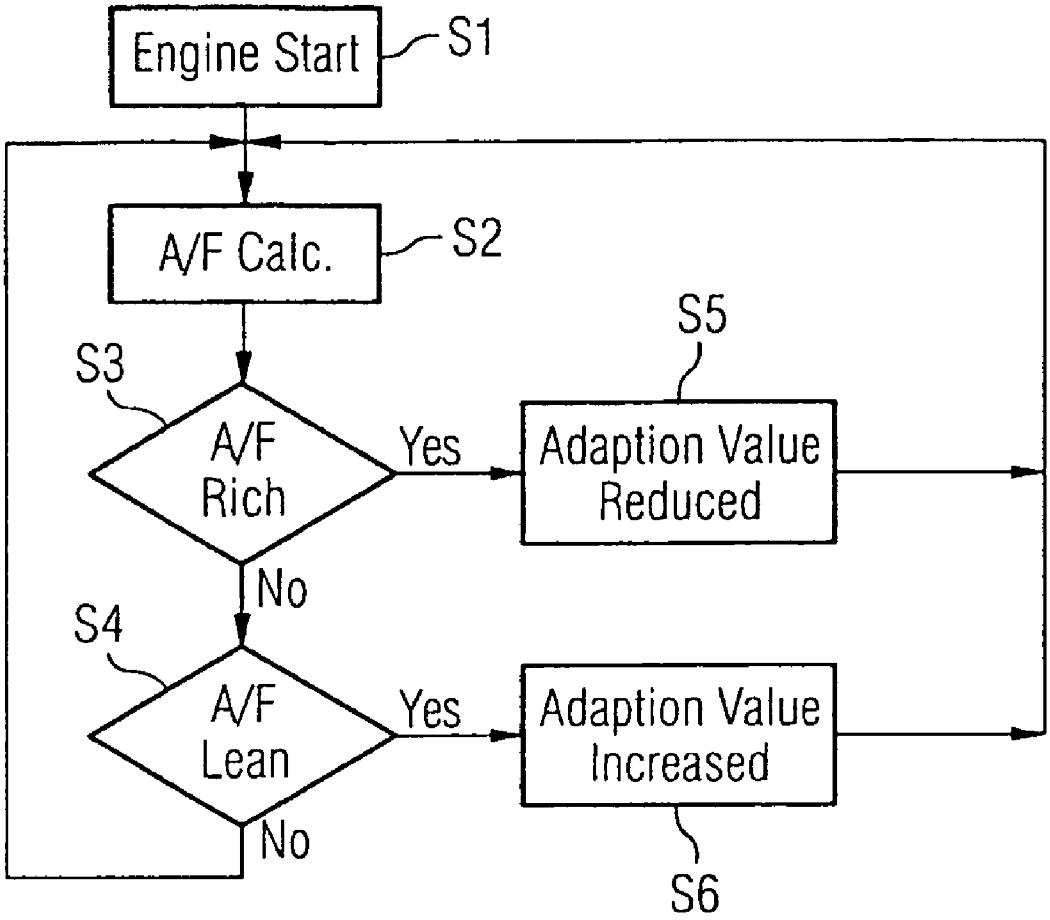
FIG. 3 shows a flow diagram for illustrating the inventive method.
Figure 4:
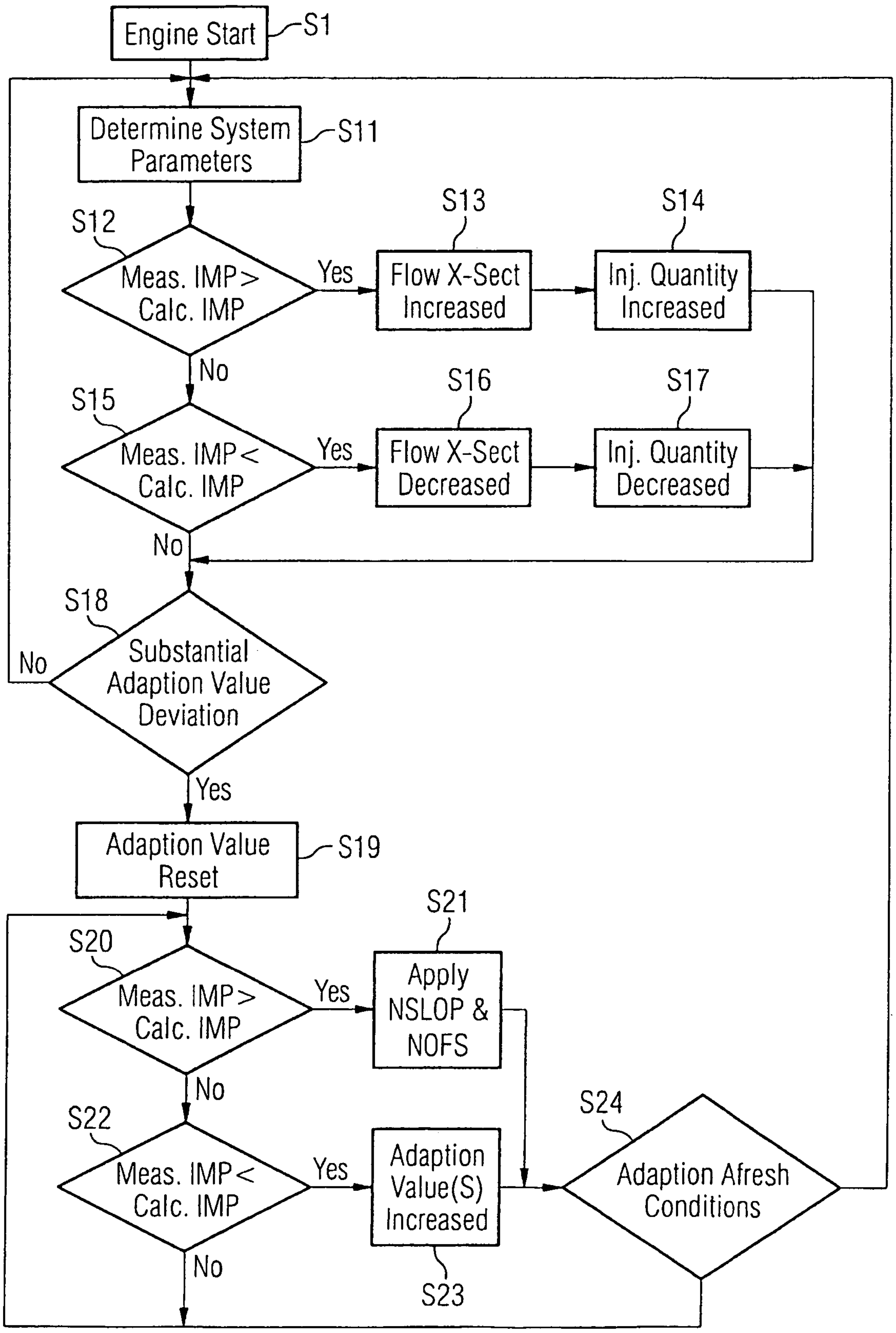
FIG. 4 shows a flow diagrams for illustrating the inventive method.

FIGS. 3 and 4 show two flow diagrams illustrating the inventive method for adapting the system parameters of flow cross-section, absorption behavior and injection quantity. The adaptation is carried out with the aid of the measured intake manifold pressure and the lambda value of the exhaust gas flowing out of the combustion chamber 3. The adaptation method is implemented as soon as the internal combustion engine is started. Essentially, two adaptations, namely the adaptation of the injection quantity and the adaptation of the flow cross-section and/or of the absorption behavior, proceed in parallel. The adaptations can also be carried out in succession one after the other.

FIG. 3 shows a flow diagram for the regularly running adaptation of the injection quantity in accordance with the lambda value determined in the exhaust pipe 7. After the internal combustion engine has been started in a step S1, a ratio of the air/fuel mixture is calculated initially for example from the rotational speed of the internal combustion engine and from the air mass flow which is to be let into the combustion chamber 3 in order to achieve the desired operating state of the internal combustion engine (step S2). Ideally, the air/fuel ratio is essentially balanced so that the air/fuel mixture is neither too rich nor to lean. If the lambda probe 13 determines in a step S3 that the mixture is richer than previously calculated, then an adaptation value for the injection quantity is reduced (step S5) so that the quantity of fuel to be injected is reduced. This can take place gradually, i.e. in accordance with a fixed increment or by means of the parameter measured by the lambda probe 13.

If it is not ascertained until a step S4 that the air/fuel mixture is leaner than calculated, then the injected fuel quantity has to be increased by increasing the relevant adaptation value (step S6). The adaptation method for adapting the injection quantity is implemented periodically so that the adaptation value for the injection quantity is after several periods set to a value at which the measured air/fuel ratio matches the calculated air/fuel ratio.

FIG. 4 shows the adaptation of the flow cross-section or of the absorption behavior of the internal combustion engine according to the invention. The sequence of the FIG. 4 flow diagram runs essentially in parallel with the sequence of the FIG. 3 flow diagram.

After the engine has been started, the system parameters for regulating the internal combustion engine are measured or computationally determined in a step S11 and the theoretically expected intake manifold pressure in the intake manifold 4 determined from the system parameters. Then, in a step S12 the pressure in the intake manifold is measured with the aid of the pressure sensor 14 and compared with the calculated intake manifold pressure. If it is established that the intake manifold pressure is greater than calculated, then it is initially assumed that this is caused by a greater flow cross-section at the throttle valve 11. In this case, the flow cross-section is adjusted upwardly (step S13) so that the calculated air mass flow increases. If the reason for the intake manifold pressure being too high is that the absorption behavior is lower then the expected value and consequently less air/fuel mixture enters the combustion chamber than calculated, the air mass flow is calculated to be too high by the corresponding adaptation value. As a result of too great an air mass flow being calculated, based on the regulation which is designed to preserve a defined air/fuel ratio, the injection quantity of fuel has to be increased in a step S14. The raising of the injection quantity then leads to too rich an air/fuel mixture since the calculated air mass is greater than the air mass really present in the intake manifold 4.

The lambda adaptation according to FIG. 3 then reduces the injection quantity in order to obtain the desired air/fuel ratio.

If the intake manifold pressure is lower than calculated (step S15), then the adaptation value for the flow cross-section is reduced so that the calculated air mass is reduced and in accordance with the regulation of the internal combustion engine the injection quantity reduced. This leads to the air/fuel ratio being rendered leaner, whereby the injection quantity is increased if the air/fuel ratio is too lean.

After the adaptation for the flow cross-section has proceeded, a check is carried out to ascertain whether, on the basis of the adaptation values for the injection quantity and the flow cross-section, it can be concluded that a substantial deviation of the real absorption behavior from the ideally expected absorption behavior applies. This is with some probability the case if the adaptation value for the flow cross-section is increased and the adaptation value for the injection quantity is reduced, or vice versa. For a deviation of the adaptation value from a neutral value, defined threshold values are preferably assumed for the percentage deviation or absolute deviation. In this way, a switch can be made, for example, from adaptation of the flow cross-section to adaptation of the absorption behavior of the internal combustion engine if the adaptation value for the flow cross-section is increased by at least a first percentage proportion, e.g. by at least 10%, relative to the neutral value and the adaptation value for the injection quantity is reduced by at least a second percentage proportion, for example also by at least 10%. This also applies if the adaptation value for the flow cross-section is reduced by the first percentage proportion relative to the neutral value and the adaptation value for the injection quantity is increased by the second percentage proportion relative to the corresponding neutral value (step S18). If this is not the case, the process jumps back to step S11 and the adaptation of the flow cross-section is carried out afresh. If, however, these deviations are identified, in a following step S19 the adaptation value for the flow cross-section is reset and the adaptation for the absorption behavior of the engine begins. If the measured intake manifold pressure is higher than expected (step S20), then by applying the appropriate values $\eta_{SLOP}$ and $\eta_{OFS}$, the absorption behavior is adapted appropriately (step S21). Alternatively, the adaptation values can also be applied to the corresponding parameters for the valve settings. The adaptation values are chosen such that the calculated absorption behavior is reduced. If the measured intake manifold pressure is lower than expected (step S22), then the adaptation value or adaptation values for the absorption behavior of the internal combustion engine are correspondingly increased (step S23). Essentially, adaptation of the injection quantity, in which a modified adaptation value that is applied to the injection quantity is determined, is simultaneously continued.

According to one embodiment, it is possible for the resetting of the adaptation value for the flow cross-section to be carried out gradually and to be reset by a defined value in the direction of the neutral value, for example, each time the adaptation method for the absorption behavior of the internal combustion engine is run through. Alternatively, it is also possible to reset the adaptation value for the flow cross-section to the neutral value at a stroke and simultaneously in accordance with a predefined calculation formula computationally to adjust the adaptation value for the absorption behavior of the internal combustion engine. In both cases, an abrupt modification of the system parameters can be avoided so that no large target/actual deviation can occur and an oscillation of the regulation can be avoided. In general, no further deviation from the adaptation of the absorption characteristic curve occurs so that no further adaptation of the flow cross-section is possible. Conditions can, however, be defined (step S24) which make it possible for an adaptation of the flow cross-section to be carried out afresh. Such a condition can, for example, be the lapse of a certain period of time so that it is possible after adapting the absorption characteristic curve to carry out a repeat adaptation of the flow cross-section. This is useful since it can occur that both absorption characteristic curve and flow cross-section reveal deviations and thus have to be corrected.

The adaptation of the absorption behavior of the internal combustion engine can be effected by adjusting valve control parameters, for example by additional adjustment of the valve overlap or of the intake or outlet valve position.

The method described stands solely as an example of a possible way of optimizing the adaptation of system parameters in an overall system which is most likely the cause of the deviation between calculated values and the measured values.

The invention consists generally in the fact that, in regulating an internal combustion engine, several deviations between measurement parameters and expected values or several adaptation values with regard to their magnitude and sign are evaluated and the corresponding system parameters for the adaptation selected such that those most likely to be responsible for the deviation between model and reality are adapted. Here, the criterion can generally be applied that the weighted sum of all adjustments which are necessary for matching modeled parameters and measurement values is minimal. In this process, several different working points of the internal combustion engine are also preferably examined. The criterion can also be applied that the adaptation values for matching modeled parameters and measurement values vary as little as possible across the working points examined.

Generally speaking, a system parameter is selected for adjustment if several deviations between measurement parameters and expected values or several adaptation values point to a deviation of this system parameter in the same direction. It is not absolutely necessary to adapt the system parameters which are most likely to be causing the model deviation by means of an adaptation method; suitable adjustment values can also be calculated directly and applied to the appropriate system parameter. Care must be taken to ensure that the adaptation values of other system parameters are correspondingly reduced, where applicable, in order to avoid an oscillation of the regulating system.

The invention claimed is:

1. A regulated internal combustion engine, comprising:
- a cylinder having a piston and a combustion chamber;
- an intake manifold having an entrance and an exit;
- a throttle valve attached to the intake manifold entrance;
- an intake valve connecting the intake manifold exit to the combustion chamber;
- an exhaust pipe attached to the combustion chamber by an exhaust valve;
- an intake manifold pressure sensor;
- an engine regulator that:
  - determines a plurality of engine parameters,
  - calculates a theoretically expected intake manifold pressure based on the engine parameters,
  - measures an intake manifold pressure,
  - compares the calculated intake manifold pressure to the measured intake manifold pressure,
  - adjusts a plurality of engine adaptation parameters to reduce the difference between the calculated and measured intake manifold pressure values and to maintain a predetermined air/fuel ratio,
  - compares a deviation of the adaptation values from respective neutral values of the engine parameters with predetermined threshold values, and
  - adjusts the adaptation parameters based upon an absorption characteristic curve of the internal combustion engine when the deviation of the adaptation values exceeds the threshold values.

2. A method for regulating an internal combustion engine where engine measurement and engine adjustment values are provided, and adaptation values modify the engine parameters, comprising:
- measuring a first engine measurement parameter representative of a first physical engine parameter;

measuring a second engine measurement parameter representative of a second physical engine parameter;

calculating a first estimation parameter via a first engine parameter;

calculating a second estimation parameter via a second engine parameter;

determining a first operating mode of the engine regulation method, the first operating mode determined by:

generating a first adaptation value based on the first engine parameter, generating a second adaptation value based on the second measurement parameter, and comparing the percent difference of the first and second adaptation values to a neutral value of the respective engine parameter; and determining a second operating mode of the engine regulation method, the second operating mode determined by:

resetting the second adaptation value for the second system parameter to an original value if the deviation of the percent difference for the first and second adaptation values exceeds a predetermined threshold value.

3. The method of regulating an internal combustion engine as claimed in claim 2, wherein a plurality of estimation parameters are calculated based upon a plurality of engine parameters.

4. The method of regulating an internal combustion engine as claimed in claim 2, wherein a third adaptation value for a third engine parameter is unchanged when a change in the second adaptation value effects a change in the first engine parameter when determining the first operating mode.

5. The method of regulating an internal combustion engine as claimed in claim 4, wherein the first and second estimation parameters are determined by the first second or third engine parameters.

6. The method of regulating an internal combustion engine as claimed in claim 5, wherein the adaptation parameters include intake throttle position and injector flow rate.

7. The method of regulating an internal combustion engine as claimed in claim 6, wherein the predetermined threshold values are +/−10% deviation from the neutral value.

8. The method of regulating an internal combustion engine as claimed in claim 5, wherein the fuel injector flow rate is determined by lambda adaptation.

9. The method of regulating an internal combustion engine as claimed in claim 5, wherein the absorption behavior of the internal combustion engine is effected by intake and exhaust valve position.

10. The method of regulating an internal combustion engine as claimed in claim 4, wherein, after the expiration of a specified period of time, a transition is made from the second operating mode to the first operating mode without the third adaptation value being reset.

11. The method of regulating an internal combustion engine as claimed in claim 4, wherein:

the first engine parameter is a fuel injection valve opening time, and the second system parameter is an intake air flow cross section, and the third system parameter is an absorption characteristic curve of the internal combustion engine or an intake and/or outlet valve setting.

12. The method of regulating an internal combustion engine as claimed in claim 2, wherein:

the second operating mode is used to regulate the engine if the first adaptation value deviates from the neutral value by +/−10% of the relative deviation value, and the second adaptation value determined in the first operating mode deviates from the neutral value by +/−10% of the relative deviation value.

13. The method of regulating an internal combustion engine as claimed in claim 2, wherein the second adaptation value for the second engine parameter is left unchanged after the resetting.

14. The method of regulating an internal combustion engine as claimed in claim 2, wherein after resetting the second adaptation value, the second adaptation value is switched to a corresponding modification of the first adaptation value and a corresponding third adaptation value.

15. The method of regulating an internal combustion engine as claimed in claim 2, wherein the second operating mode is used to regulate the engine if:

the first adaptation value is increased relative to the neutral value by the amount of the first deviation value, and the second adaptation value determined in the first operating mode is reduced relative to the neutral value by the amount of the second deviation value.

16. The method of regulating an internal combustion engine as claimed in claim 2, wherein the second operating mode is used to regulate the engine if:

the first adaptation value determined is reduced relative to the neutral value by the amount of the first deviation value, and the second adaptation value determined in the first operating mode is increased relative to the neutral value by the amount of the second deviation value.

17. The method of regulating an internal combustion engine as claimed in claim 2, wherein the first operating mode is used to regulate the engine each time the engine is started.

18. The method of regulating an internal combustion engine as claimed in claim 2, wherein the air/fuel ratio of the internal combustion engine is determined by an exhaust pipe gas measurement and is assigned as the first measurement value, and the induction pipe pressure in the induction pipe is assigned as a second measurement value.

19. A method for regulating an internal combustion engine, comprising:

determining plurality of engine parameters;

calculating a theoretically expected intake manifold pressure based on the engine parameters;

measuring an intake manifold pressure;

comparing the calculated intake manifold pressure to the measured intake manifold pressure;

adjusting a plurality of engine adaptation parameters to reduce the difference between the calculated and measured intake manifold pressure values and to maintain a predetermined air/fuel ratio;

comparing a deviation of the adaptation values from respective neutral values of the engine parameters with predetermined threshold values; and adjusting the adaptation parameters based upon an absorption characteristic curve of the internal combustion engine when the deviation of the adaptation values exceeds the threshold values.

* * * * *